Aug. 25, 1936.    T. B. TYLER    2,052,430
CLUTCH FOR TRANSMISSIONS
Filed June 6, 1932
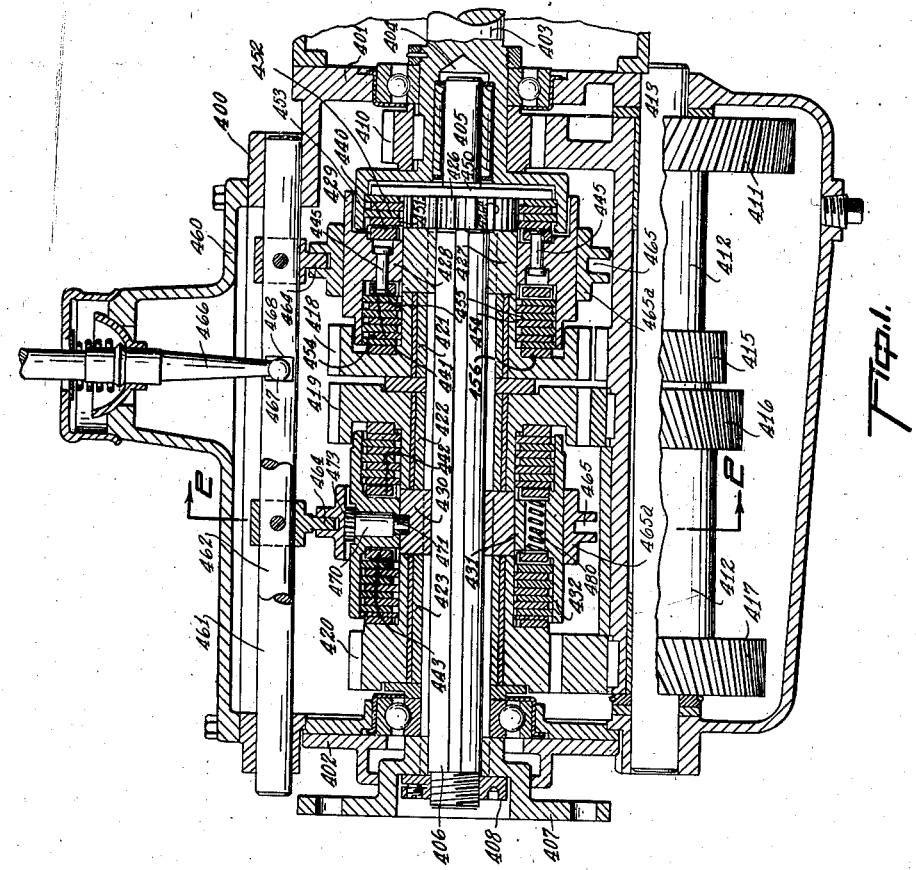
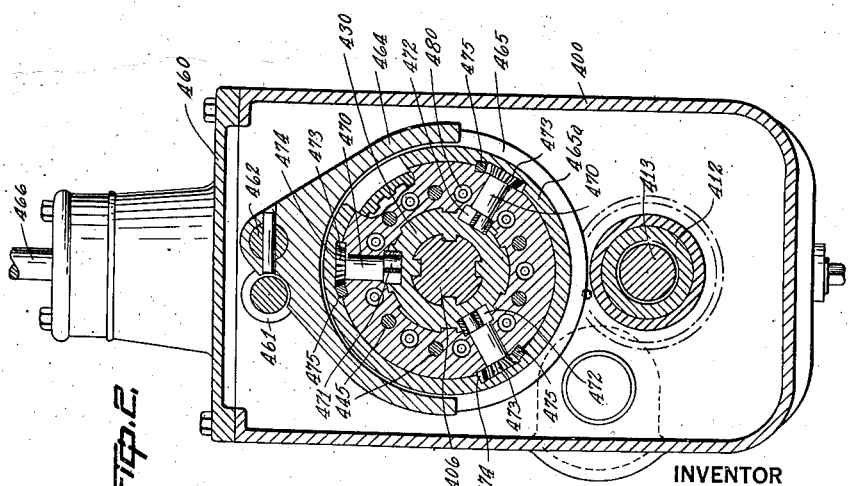
INVENTOR
*Tracy Brooks Tyler*
BY
ATTORNEYS Patented Aug. 25, 1936

2,052,430

UNITED STATES PATENT OFFICE 2,052,430

CLUTCH FOR TRANSMISSIONS

Tracy Brooks Tyler, Detroit, Mich., assignor to The Monopower Corporation, Detroit, Mich., a corporation of Michigan Application June 6, 1932, Serial No. 615,631

4 Claims. (Cl. 192—69)

This invention relates to clutches for transmissions.

An object of the present invention is to provide clutches for a multi-clutch transmission whereby the said transmission differs from conventional multi-clutch transmissions in that pressure clutches of the friction type, are employed, in lieu of the conventional positive tooth clutches.

In the illustrated embodiment of the invention, the clutches are not clustered, as in my co-pending applications Serial No. 611,384, filed May 14, 1932; Serial No. 612,194, filed May 19, 1932, and Serial No. 614,349, filed May 31, 1932, but are spaced between the torque transfer parts. Further, the illustrated embodiment includes multi-plate, oil-immersed clutches, and in this respect resembles the transmission of Serial No. 614,349.

Other objects of the invention will become apparent upon reference to the following detailed description and to the appended drawing, in which Figure 1 is a longitudinal section view of a transmission of the invention, and Fig. 2 is a section on line 2—2 of Fig. 1.

Referring to these figures, it will be seen that the transmission includes a casing 400 having transverse walls 401 and 402. In the wall 401 is journaled the end of a power or driving shaft 403, having a cup-shaped end, in the cup 404 of which is journaled the end 405 of a splined shaft 406, the latter being journaled at its other end in the wall 402 and having a coupling head 407 secured thereon by a threaded nut-like plate 408. The shaft 403 may be considered the drive shaft and the shaft 406 may be considered the driven shaft, for purposes of convenience.

Keyed to the end of shaft 403 near the cup 404 thereof is a gear 410 in constant mesh with a gear 411 formed on or keyed to a hollow sleeve 412, the latter being supported and journaled on a stationary countershaft 413 which connects and is supported in the opposed walls 401 and 402 of the transmission casing. Formed on or keyed to the sleeve 412 are gears 416 and 417 in constant mesh respectively, with gears 419 and 420, freely journaled on sleeves 422 and 423, fixed to the splined shaft 406. Formed on or keyed to the sleeve 412 is a gear 415 which is connected to gear 418 through means of an idler gear (not shown) in a manner well known in the art, and for this reason not shown here. The gear 418 is freely journaled on sleeve 421 which is likewise fixed to the splined shaft 406.

It will be observed at this time that gears 415 and 418, being meshed through an idler, not shown, constitute part of the reverse drive mechanism.

Also splined on shaft 406 between sleeve 421 and an enlarged head 426 formed on the splined shaft 406 is a collar 427 to which is splined the web 428 of a shell 429. Further, splined to shaft 406 between sleeves 422 and 423 is a second collar 430 to which is splined the web 431 of a second shell 432. These shells constitute the normally driven elements of the sets of torque transmitting engaging elements in the transmission and selectively cooperate with driving elements to be described below to create drives between shafts 403 and 406.

It will be seen that the sleeves 421, 422, 423, the collars 427 and 430, and certain other parts, such as journals and bushings take up the entire length of shaft 406 from plate 408 to enlargement 426, and are thus held non-slidable with respect to shaft 406.

Disposed within the shells and adjacent their webs, are annular plates 440 to 443 inclusive and to these the webs are slidably, though non-rotatably, connected by four groups of studs 445, passing through the webs and plates and disposed as follows: one group of studs in each web has its permanent heads in counterbores on the left sides of the webs 428, 431 and its riveted-over heads on the right sides of plates 440, 442, these studs permitting the webs 428, 431, and plates 440, 442, to be moved toward the plates 441, 443 towards the left, a slight and limited distance. Second groups of studs, inter-spaced with the first mentioned groups on the webs, face oppositely, so as to permit the webs 428, 431 and plates 441, 443 to be moved towards the plates 440—442, towards the right, a slight and limited distance.

Further, disposed in the shell 429 between the pressure plate 440 and an enlarged flange 450 of the shaft 406 are sets of interfitted annular clutch plates 451, 452, the former set being mounted on splines 426a on the enlargement 426 of the shaft 406 and the latter set being splined to the annular flange 453 formed on the end of driving shaft 403, the enlargement 450 in this case forming a backing plate for these clutch plates. In the shell 429, between web 428 and gear 418 are similarly disposed and fashioned sets of clutch plates 454—455, splined respectively, to the shell 429 and to the hub of gear 418, there also being a backing plate 456 in this space, against the gear web.

Similar sets of clutch plates are disposed in shell 432 between the pressure plates 442 and 443 thereof and the unreferenced backing plates against the webs of gears 419 and 420, certain of these plates being splined to the shell 432 and others being splined to the hubs of these gears.

It will be seen that when any web is moved towards one of its pressure plates, it presses a set of clutch plates into clutching engagement and creates a driving connection between one of the driving parts, namely, shaft 403 or gears 418, 419, 420, and one of the driven parts, namely, the shell webs. The nature of the driving relation depends upon the selection of the backing plate against which the web is to be moved. It therefore appears desirable to provide means for selecting a web and pressure plate to be moved and to move such web and plate, and for this purpose selector means, which will now be described, are provided.

Disposed above the parts heretofore mentioned and under the cover 460 of the transmission are two parallel longitudinally disposed shifter rails 461, 462, mounted to slide in the walls 401—402 of the transmission casing, as indicated. Each of these shifter rails is provided with a fork 464 seated in the groove 465 of a ring 465a surrounding a shell. In the embodiment shown where there are two shells having each two pressure plates to be moved, there are two forks, one on each shaft, each fork being adjacent a shell.

For selecting which of the rails is to be reciprocated, and for reciprocating them, there is provided a shift lever 466 having a ball end 467 adapted to be moved into one or the other of notches 468 in the shifter rails. These notches face each other and are also open to the top so that the shift lever end may be moved transversely across the space between the rails to find a seat in one or the other of the rail notches 468. When so seated the ball may be moved longitudinally of the transmission to reciprocate the thus selected rail and to move the thus selected fork in the direction desired.

Means in each shell for translating movement of a grooved ring into movement of a web and pressure plate includes a set of radially extending peripherally spaced pinions having cylindrical portions 470 disposed in cylindrical radially disposed bores of the shell webs, and also having eccentric roller studs 471 disposed in parti-circumferential narrow slots 472 of the collars 427, 430. These pinions further have toothed heads 473 disposed in longitudinally extending internal slots 474 of the grooved rings, which slots further contain securely mounted rack toothed portions 475 whose teeth are meshed with the teeth of the pinion heads 473.

It will be seen that when a grooved ring is moved longitudinally, the pinions therein will be rotated and since the eccentric portions 471 are held against sliding longitudinally in the non-slidable collars 427, 430 the cylindrical portions 470 will act as cams to move a shell web and a pressure plate.

It will be observed that pinions thus rotated will be locked in their shell-thrusting position by the dead centers of the eccentric portions forming a lock against coiled compression springs 480 disposed in spaced longitudinal apertures of the webs. The springs 480 are compressed between the pressure plates 440 and 441 and between the pressure plates 442 and 443 and, because the studs 445 are constructed to permit a limited amount of movement of the pressure plates relative to their respective webs, the springs 480 yieldingly hold the pressure plates spaced from their respective webs. If, for example, the web 428 is moved to the right (in Fig. 1), the upper pin 445 moves therewith, carrying the pressure plate 441 therewith. The left hand ends of the springs 480 being seated against the pressure plate 441 causes the springs 480 to move also and to impart clutch engaging pressure to the pressure plate 440. After the clutch has been engaged in this manner additional movement of the web 428 is possible because the springs 480 compress and permit relative movement between the web 428 and the pressure plate 440, and such additional movement takes place until the eccentric elements reach and slightly pass their dead center points. Obviously, there will be a slight retractive movement of the web 428 accompanying any movement of the eccentric elements past their dead center points, but inasmuch as the springs 480 are at this time compressed as a result of relative movement between the web 428 and the pressure plate 440 they will maintain the pressure plate 440 in a clutch engaging position during such retractive movement. The springs 480 thus serve as a yieldable pressure transmitting means between the webs and the pressure plates and permit the eccentric type actuating means to be moved slightly past its dead center point to lock the web in clutch engaging position, without destroying the clutch engagement as a result of the retractive movement which occurs as the eccentric means passes its dead center.

It will further be observed that springs 480 take up wear of the clutch plates and permit the pinions 473 to be rotated always to dead center for full clutch engagement thus forming a back lock maintaining a predetermined minimum engagement pressure regardless of the wear of these plates.

It will be observed at this time that direct drive from shaft 403 to shaft 406 is effected through the annular flange 453, clutch set 451, 452, and enlargement 450 on the shaft 406. Other drives are effected from shaft 403, through gears 410 and 411, gears 415—416—417 on countershaft, gears 418—419—420, the selected clutch set, and the adjacent shell and collar, to shaft 406.

It will further be observed that the flange 450 on the shaft 406 acts as a backing plate for the direct drive clutch set. Accordingly there is no tendency of the shafts 403 and 406 to separate longitudinally as would be the case if any part of or secured to the shaft 403 were used as the backing plate.

The transmission disclosed possesses advantageous characteristics and features inherent to the transmissions disclosed in my copending applications aforementioned. Further to operate the transmission it is unnecessary to resort to an actuating member other than shift lever 466. The latter may be moved at any time and at any speed of the vehicle, to effect any engagement in the transmission, silently and without difficulty or delay.

It will also be observed that the clutches are operatively and physically located between the torque transferring elements, namely, the gears, and the driven part and accordingly the unselected clutches are not overspeeded when a direct drive is created, as is the case with other forms of pressure clutch transmissions.

It will also be observed that the transmission shown is extremely compact, this being due to the fact that the external diameter of the clutches is less than that of the larger gears, and by the fact that the clutch portions move axially, rather than radially.

Further, even though pressure clutches are used, the construction shown is such that there are no forces tending to separate shafts 403—406 axially.

Further, since the gears must be provided, utilizing them as clutch parts, effects simplicity of operation as well as of manufacture. The use of but one set of selector parts, for each pair of clutches also promotes simplicity.

Further, even though the clutches are of the pressure engaging type, there is very little opposition to clutch engagement or disengagement, for the movable or controlling part, namely, the grooved ring 465a can move freely and easily along the shells 429 and 432 without opposition.

Now having described the invention and an embodiment of the same, reference will be had to the following claims which define the scope of the invention.

What I claim is:

1. In a clutch, a drive member carrying a plurality of friction disks, a driven shaft, a shell connected with said driven shaft and supporting a plurality of disks adapted to cooperate with said first named disks in forming a driving connection, pins in said shell having eccentric bearings fixed against axial movement relative to said shaft, yieldable means in said shell and operatively associated with said disks, and means for rotating said pins whereby said eccentric bearings cause sliding movement of said shell to engage and disengage said friction disks by pressure transmitted through said yieldable means, said last named means being adapted to rotate said pins to a dead center point positively locking said disks against movement as a result of the urge of said yieldable means.

2. In a clutch, a drive member, a plurality of friction disks secured against rotation on said drive member, a driven member, a slidable element keyed on said driven member, friction disks non-rotatably and slidably secured relative to said slidable element, yieldable means interposed between said slidable element and its respective friction disks whereby upon movement of said slidable element said friction disks are moved into yielding engagement with said first named disks, rotatable elements mounted in said slidable element, eccentrics on said rotatable elements, and bearings axially fixed relative to said driven member and receiving said eccentrics whereby upon rotation of said rotatable elements said eccentrics cause engagement and disengagement of said friction disks.

3. A clutch comprising driven and drive members having inter-engageable friction disks respectively mounted thereon and adapted to form a driving connection therebetween, a slidable element mounted on one of said members and adapted to cause engagement and disengagement of said friction disks by sliding movement thereof, yieldable means between said slidable element and said friction disks providing for yielding engagement thereof, bearings axially fixed relative to said last named member, rotatable elements mounted in said slidable element, eccentrics on said rotatable elements and received in said bearings, and means for rotating said rotatable elements whereby said eccentrics cause sliding movement of said slidable element.

4. A clutch comprising driven and drive members having interengageable friction disks respectively mounted thereon and adapted to form a driving connection therebetween, a slidable element mounted on one of said members and adapted to cause engagement and disengagement of said friction disks by sliding movement thereof, yieldable means between said slidable element and said friction disks providing for yielding engagement thereof, bearings axially fixed relative to said last named member, rotatable elements mounted in said slidable element, eccentrics on said rotatable elements and received in said bearings, and means for rotating said rotatable elements whereby said eccentrics cause sliding movement of said slidable element, said last named means being adapted to rotate said rotatable elements and said eccentrics to a dead center point where said yieldable means causes the parts to be locked in a position holding the friction disks engaged.

TRACY BROOKS TYLER.